United States Patent [19]

Carroll et al.

[11] 3,914,188
[45] Oct. 21, 1975

[54] METHOD OF PREPARING CELLULAR FOAMS USING POLYMERIC STABILIZER OF CYCLIC NITROGENOUS MONOMERS

[75] Inventors: Felix P. Carroll, Chester, Pa.; John R. Panchak, Wilmington, Del.; Nelson N. Schwartz, Broomall, Pa.

[73] Assignee: Air Products and Chemicals, Inc., Allentown, Pa.

[22] Filed: Jan. 31, 1974

[21] Appl. No.: 438,241

[52] U.S. Cl.. 260/2.5 AG; 260/2.5 A; 260/2.5 AW; 260/2.5 BE
[51] Int. Cl.² .................. C08G 18/14; C08G 73/06; C08L 75/04; C08L 79/04
[58] Field of Search.. 260/2.5 BE, 2.5 AG, 2.5 AW, 260/2.5 A

[56] References Cited
UNITED STATES PATENTS

| | | | |
|---|---|---|---|
| 3,085,983 | 4/1963 | Hardy | 260/2.5 AG |
| 3,270,032 | 8/1966 | Erner | 260/2.5 AG |
| 3,746,663 | 7/1973 | Beale | 260/2.5 AG |
| 3,775,350 | 11/1973 | Juhas | 260/2.5 BE |
| 3,823,096 | 7/1974 | Fabris | 260/2.5 AP |

*Primary Examiner*—Donald E. Czaja
*Assistant Examiner*—C. Warren Ivy
*Attorney, Agent, or Firm*—Richard A. Dannells; Barry Moyerman

[57] ABSTRACT

An improvement in the method of preparing a cellular foam from a precursor formulation comprising an isocyanate having at least two isocyanato groups per molecule, a catalyst, and a blowing agent is achieved by adding from 0.2 to 5.0 parts by weight per 100 parts by weight of the precursor formulation of the product of a free radical-initiated polymerization of a cyclic nitrogenous monomer having the following structural formula:

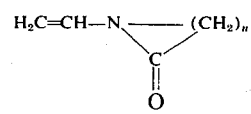

wherein $n = 3, 4$ or $5$.

The product can also be the result of the free radical-initiated copolymerization of the nitrogenous monomer and an esterified unsaturated dibasic acid containing 4 or 5 carbon atoms. The ester has 10 to 17 carbon atoms per molecule. The copolymerization of the nitrogenous cyclic monomer and the ester can take place in the presence of a polyfunctional polyether in which the hydroxyl groups are capped by a suitable reagent either before or after the copolymerization in order to convert the hydroxyl groups to ones which are substantially inert to isocyanate.

10 Claims, No Drawings

METHOD OF PREPARING CELLULAR FOAMS USING POLYMERIC STABILIZER OF CYCLIC NITROGENOUS MONOMERS

Background of the Invention

1. Field of the Invention

This invention relates to an improvement in the method for the preparation of cellular foam stabilizer compositions effective in the stabilization of foam bodies prepared from isocyanate-containing formulations. These foam bodies are of the rigid and semi-rigid type such as poured-in-place installation for refrigerators, freight cars or the like and for crash pads, furniture construction, decorative panels or other similar uses. More particularly, this invention relates to an improvement in the method of stabilization of foam products containing polyurethane, polyisocyanurate or polyoxazolidinone groups.

2. Prior Art

Erner, U.S. Pat. No. 3,270,032 describes a stabilizer oil which is a terpolymer obtained by the free radical terpolymerization of N-vinyl pyrrolidone, dibutyl maleate and vinyl acetate in the presence of a long chain monohydric alcohol. The resultant hydroxylic material, per se, is recovered and used as a stabilizer oil which has a degree of effectiveness in the stabilization of foamed polymers, especially rigid polyurethane foams.

Stamberger, U.S. Pat. No. 3,383,351, describes a method of preparing polyurethane foams by first polymerizing an ethylenically unsaturated monomer which includes certain cyclic nitrogenous monomers defined under the Summary of the Invention in the presence of a polyfunctional polyol and then using the resulting polyhydroxylic polymers in place of prior art polyols in a polyurethane foaming process, which process requires the use of silicone oil additives as the cell stabilizer.³ Stamberger's material serves as the main polyol for urethane formulation, but does not contribute to foam stabilization.

Beale et al., U.S. Pat. No. 3,746,663 describes a cell stabilizer which is a polymer of N-vinyl pyrrolidone, or a copolymer of N-vinyl pyrrolidone and dibutyl maleate, or a terpolymer of N-vinyl pyrrolidone, dibutyl maleate and vinyl acetate, where the polymerization must be performed in the presence of a polyfunctional polyether polyol. Such polyhydroxylic materials are excellent cellular foam stabilizers, but because the product contains free hydroxy groups, they react with and destroy isocyanto groups, increase the viscosity of the isocyanate component and therefore, cause an undesirable modification of the activity of the finished stabilizer on storage in isocyanate-premix systems.

Summary of the Invention

One of the objects of the present invention in contrast to those of the prior art is to provide a cell stabilizer for the use in the preparation of rigid and semi-rigid foams of not only polyurethane-containing, but of polyoxazolidinone- and polyisocyanurate-containing foams.

Another object of the invention is to provide a cell stabilizer that can be mixed with the isocyanate or prepolymer component, without resulting in a chemical reaction which consumes isocyanate and increases the prepolymer viscosity, thus allowing one to store the resulting mixture for prolonged periods of time.

Another object of this invention is to provide a cell stabilizer that can be mixed with the diepoxide used to prepare polyoxazolidinone foams, without resulting in a chemical reaction which consumes epoxides.

Still another object of this invention is to provide a readily manageable and soluble or dispersible cell stabilizer for the incorporation in precursor formulations for polyurethane-, polyoxazolidinone- and polyisocyanurate-containing products.

In accordance with this invention, there is provided, in a method for preparing a cellular foam from a precursor formulation comprising an isocyanate having at least two isocyanato groups per molecule, a catalyst, and a blowing agent, the improvement of adding the product of a free radical-initiated polymerization of a monomer having the structural formula:

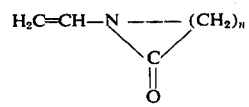

wherein
$n = 3$, 4 or 5.

The resulting cell stabilizer exhibits marked improvement in effectiveness such as premix compatibility, hydrolytic stability and foam physical properties as well as having the advantage of being able to be premixed with isocyanates without either component being altered in its effectiveness during prolonged storage.

The foregoing cyclic nitrogenous monomer can be homopolymerized or copolymerized with an esterified unsaturated dibasic acid, in the presence of the free radical initiator. The structural formula of the ester of the unsaturated dibasic acid is:

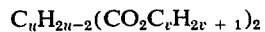

wherein
$u$ is 2 or 3 and
$v$ is an integer from 3 to 6.

The homopolymerization or copolymerization reaction can be carried out either in bulk or in solution using any suitable organic solvent inert to the polymerization reaction. Suitable solvents are polyether polyols which are capped or protected, as described below, either before or after the polymerization. Typical examples of other suitable solvents include toluene, benzene, acetonitrile, ethyl acetate, hexane, heptane, dicyclohexane, dioxane, acetone, N,N-dimethylformamide, N,N-dimethyl-acetamide and the like.

The copolymerization reaction can be carried out in the presence of a polyfunctional polyether polyol which has been treated with a suitable capping agent to convert the hydroxyl groups of the polyether polyol to groups substantially inert to isocyanate. The capping treatment may take place either before or after the polymerization. The capped copolymers of the cyclic nitrogenous and the ester monomers have the following structural formula:

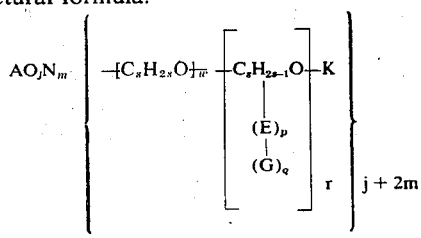

wherein
A is a cyclic or acyclic group having 1 to 12 carbon atoms, 2 to [26 − (j + m)] hydrogen atoms, 0 to 4 oxygen atoms, and 0 to 2 nitrogen atoms,
E is a group having the structure

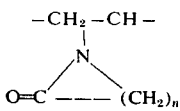

wherein $n$ is 3 to 5,
G is a group having the structure

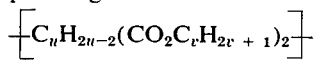

wherein $u$ is 2 or 3 and $v$ is an integer from 3 to 6,
K is a radical selected from the group consisting of R—, RCO—, RNHCO—, ROC(CH$_2$)H—, and

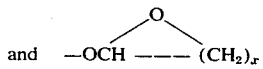

wherein R is a cyclic or acyclic radical having 1 to 18 carbon atoms and x is 3 or 4,
$j$ is an integer from 0 to 8,
$m$ is an integer from 0 to 4,
$j + m$ is 1 to 8,
$s$ is an integer from 2 to 4,
$w$ is 1 to 200,
$p$ is 1 to 10,
$q$ is 1 to 10, and
$r$ is 1 to 50.

The sequences of $(E)_p$ and $(G)_q$ in

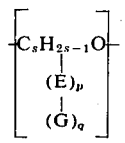

and the sequences of

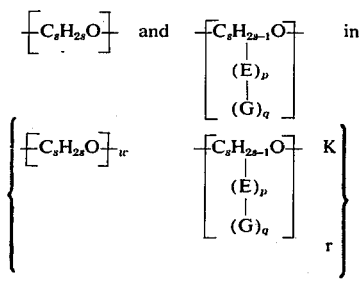

are random.

Preferred Embodiments of the Present Invention

Typical examples of suitable capping agents in the treatment of the polyfunctional polyether polyols include acetic anhydride, acetyl chloride, ketene, benzoyl chloride, benzoic acid, methyl isocyanate, ethyl isocyanate, phenyl isocyanate, and esters of butyric, caproic, capric, lauric, myristic, palmitic, stearic and oleic acids, or the free acids, and vinyl ethers such as methyl vinyl ether, n-butyl vinyl ether, isobutyl vinyl ether, and 2,3-dihydrofuran.

In the Examples below, typical capping treatments are given in which the capping temperatures ranged from 50° to 140°C for such capping agents as acetic anhydride, an isocyanate, a fatty acid, and certain vinyl ethers. A catalyst for this treatment is not required except when employing vinyl ethers as the capping agents. In the latter case, the Examples below illustrate the use of an acid catalyst, i.e., potassium bisulfate.

The cyclic nitrogenous monomers that can be employed in the cell stabilizers of the present invention are N-vinyl-2-pyrrolidone, N-vinyl-2-caprolactam and N-vinyl-2-piperidone.

Typical examples of the esters that may be used in the cell stabilizers of this invention include dibutyl fumarate, dihexyl fumarate, dibutyl maleate, diamyl methylenemalonate, dipropyl itaconate and dibutyl itaconate.

The polyfunctional polyether polyol that may be used in the cell stabilizer of the present invention is the reaction product of the alkylene oxide treatment of water or a polyhydric alcohol having 2 to 8 hydroxyl groups, such as glycerine, propylene glycol, sorbitol, sucrose, aminosucrose, alpha-methyl glucoside, ethylene glycol, pentaerythritol, trimethylolpropane, and the like. Such a polyalkylene oxide adduct is further characterized in that the weight average molecular weight is in the range of about 500 to about 5000. A preferred range with triols is a weight average molecular weight from about 1500 to about 4000.

The alkylene oxide used in the preparation of the polyether polyols may be ethylene, propylene, or butylene oxide or mixtures thereof. Propylene oxide is preferred and approximately equal results are obtained when the treatment is first with propylene oxide and then with ethylene oxide, or a mixture of the two.

The free radical initiator used in the homopolymerization or copolymerization reactions of this invention may be any of the known free radical initiators, including for example, the peroxide type such as benzoyl peroxide, or the axo type such as azo-bis-isobutyronitrile; with the provisions that such free radical initiators are effective at the polymerization conditions, preferably being effective at temperatures in the range of from about 30° to about 140°C.

The polymerization conditions and procedures are within the skills currently available in the art and are selected to obtain the desired degree of polymerization, which includes control of chain length, viscosity and weight average molecular weight. The means of effecting control of the product to insure an acceptable state may include the use of known chain transfer agents, such as mercaptan or halogenated hydrocarbons, inasmuch as such agents impart no particularly detrimental effect, when employed in normal amounts, on the quality of the product cell stabilizer.

The total polymerization reaction product or the polymeric material isolated from the solvent utilized in the polymerization is employed in the isocyanate-containing formulation in an amount in the range of 0.2 to 5.0 parts by weight per 100 parts by weight of the precursor formulation.

The polymeric compositions of this invention exhibit an ease of blendability or dispersibility into the components of the precursor formulation of rigid and semi-rigid polyurethane-, polyoxazolidinone- and polyisocyanurate-containing foams without causing chemical reaction, polymer viscosity build-up, or undesirable modification of the activity of such stabilizers or such isocyanate-containing components over prolonged periods of storage in isocyanate premix systems. Such cell stabilizer compositions can be readily prepared as moderately low viscosity fluids which have the added advantage of being readily pumpable directly to the machine head for blending with the other components of the precursor formulations.

It is within the purview of this invention to strip off most or any part of the unreacted remaining monomer and/or inert solvent and to have the thus stripped residue considered as the entire reaction product.

Although the essentially non-hydroxylic containing products of this invention may or may not contain capped polyether polyols, separate tests have shown that the capped polyether polyols alone are ineffective as foam stabilizers. When, however, the polymerization or copolymerization described in this invention is performed in a polyether polyol as defined above in which the hydroxy groups are previously or subsequently capped, the effectiveness of a given weight of polymerized monomer or monomers is greater than that observed when the product is prepared in the absence of the capped polyether polyol. The result is also the same when a physical mixture is prepared from the homo- or copolymer and the capped polyether polyol.

The isocyanates used to form the cellular foam in the method of the present invention must have at least two isocyanato groups per molecule. Such polyisocyanates include any of the known aliphatic, cycloaliphatic, araliphatic and aromatic di- or polyisocyanates. The preferred isocyanates are 2,4- and 2,6-toluene diisocyanate (TDI) and mixtures thereof. Any of the other conventionally employed polyisocyanates such as diisocyanatodiphenylmethane, condensation products providing a plurality of phenyl groups and a plurality of isocyanato groups, hexamethylenediisocyanate, chlorophenyldiisocyanate, bromophenyldiisocyanate, tetraisocyanatodiphenylmethane and the like may be used.

If it is desired that the cellular foam contains polyurethane linkages, the precursor foam formulation also includes a polyol which is the reaction product of the alkylene oxide treatment of water or a polyhydric alcohol having 2 to 8 hydroxyl groups, such as glycerine, propylene glycol, sorbitol, sucrose, aminosucrose, alphamethyl glucoside, ethylene glycol, pentaerythritol, trimethylolpropane, and the like. Such a polyolalkylene oxide adduct is further characterized in that the weight average molecular weight is in the range of about 400 to about 6000. The alkylene oxide may be any of those described above in connection with the capping treatment.

It it is desired that the cellular foam contains polyoxazolidinone linkages, the precursor foam formulation also includes a diepoxide such as vinyl cyclohexane diepoxide, dicyclopentadiene diepoxide, butadiene diepoxide or the reaction product of 2,2-di(4-hydroxyphenyl)propane and epichlorohydrin.

The blowing agents used to form the foam in the method herein described may be water and/or a volatile organic agent such as dichlorodifluoromethane-Freon 12; dichlorofluoromethane; trichloromonofluoromethane; 1,1-dichloro-1-fluoroethane; 1-chloro-1,1-difluoro-2,2-dichloroethane; 1,1,1-trifluorobutane; 2-chloro-2-fluorobutane; 3,3-difluorobutane; 4,4,4-trifluorobutane; 1,1-difluoroethane; $C_4F_8$ cyclic-Freon C-318; dichlorotetrafluoroethane-Freon 114; trichlorotrifluoroethane-Freon 113; methylene chloride; carbon tetrachloride; butanes; pentanes; and the like. Any suitable blowing agent may be employed in the precursor formulation of this invention.

The catalysts utilized in the preparation of the cellular foams by the method of this invention may include any of the well known amine or tin catalysts such as triethylene diamine, methyltriethylene diamine, dimethylaminoethyl morpholine, bis (dimethylaminoethyl)ether, hydroxypropyl imidazole, tetramethyl guanadine, tetramethylbutane diamine, 2,4,6-tris(dimethylaminomethyl)phenol, dibutyl tin diacetate, stannous laurate and mixtures thereof.

The following examples illustrate the method of the present invention and some of the advantages derived therefrom.

EXAMPLE 1

A solution of 27 g. of N-vinyl-2-pyrrolidone and 57 g. of dibutyl itaconate was added to 250 ml. of toluene in a nitrogen atmosphere while stirring at 95°C over a 2 hour period and while simultaneously adding a solution of 0.9 g. of azo-bis-isobutyronitrile and 0.3 g. of t-butylperoxyperbenzoate dissolved in 85 ml. of toluene. After all of the foregoing reactants had been added, the temperature was raised to 105°C for one hour and the resulting polymerized product was stripped to remove the toluene solvent under reduced pressure to leave an orange viscous liquid.

EXAMPLE 2

A solution of 2.25 g. of azo-bis-isobutyronitrile and 0.75 g. of t-butylperbenzoate dissolved in 120 g. of dibutyl maleate was added over a 2 hour period to 500 ml. of toluene with continuous agitation and heating to maintain a temperature of 95°C under a slow addition of nitrogen while simultaneously adding 66 g. of N-vinyl-2-pyrrolidone. After the foregoing reactants had been added to the reactor, the temperature was raised to 105°C for 1 hour. The pressure was then reduced to remove the toluene. 190 g. of an amber viscous liquid polymeric product was recovered.

EXAMPLE 3

The procedure of Example 2 was repeated except that dibutyl fumurate was used in place of the dibutyl maleate. The product recovered in this Example was an amber semi-solid material.

EXAMPLE 4

A solution of 2.25 g. of azo-bis-isobutyronitrile and 0.75 g. of t-butylperbenzoate dissolved in 120 g. of dibutyl maleate was added over a 2 hour period to 560 g. of Polyglycol 15-200 a polyoxyalkylene ether containing methyl side chains and terminal hydroxyl groups, having an average molecular weight of 2600, a specific gravity at 25°C of 1.063, a viscosity at 100°F of 206 centistokes, (and can be purchased in commercial quantities from Dow Chemical Co.). Simultaneously, 66 g. of N-vinyl-2-pyrrolidone were also added to the reaction mixture. The reaction was conducted in a nitrogen atmosphere with agitation while maintaining a temperature of the reaction mixture at 90°–95°C. After the 2 hour reaction period, the temperature was then raised to 110°C. After stirring an additional hour, 70 g. of acetic anhydride were added to cap substantially all of the hydroxyl groups of the commercially available polyol in the reaction mixture. An exothermic reaction occurred during this capping operation. The mixture was stirred for an additional 3 hours at 140°C and then the pressure was reduced to 25 mm to remove volatile materials. After all of the volatile materials had been removed, the polymeric product was cooled and bottled. The hydroxyl and acid numbers of the product were both below 3. The molecular weight as determined by gel permeation chromatography was approximately 3600.

EXAMPLE 5

The same procedure as followed in Example 4 was followed in this Example with the exception that 55 g. of ethyl isocyanate and 1 g. of dibutyl tin dilaurate were substituted for the acetic anhydride capping agent and the temperature during the addition of the capping agents was maintained at 70°C.

EXAMPLE 6

The procedure of Example 4 was again repeated but in place of the Polyglycol 15-200, Pluronic L-72 (a 2650 (approx.) molecular weight diol which is prepared by the oxyethylation of a polypropylene glycol and is available in commercial quantities from BASF/Wyandotte Corp.) was used and in place of the dibutyl maleate, dibutyl fumarate was used. The resulting product was a pale liquid of medium viscosity.

EXAMPLE 7

The procedure of Example 4 was again repeated but in place of the acetic anhydride capping agent, the solution was treated with 70 g. of isobutyl vinyl ether and 10 g. of solid potassium bisulfate. After stirring the mixture for 4 hours at 95°C, 15 g. of solid sodium carbonate were added. The mixture was then stirred for another hour, cooled and filtered. The hydroxyl number of the resulting product was 8 and the acid number was one-half.

EXAMPLE 8

The procedure of Example 4 was again repeated but in place of the acetic anhydride capping agent, 181 g. of oleic acid were added and the mixture was heated under reduced pressure until no more water was evolved. The pale yellow product had a hydroxyl number of 10 and an acid number of 3.

EXAMPLE 9

560 g. of Pluronic L-72 and 70 g. of acetic anhydride were heated for 2 hours at 95°C and then stripped to a constant weight under reduced pressure. To this material under constant agitation at a temperature of 95°C with a slow addition of a stream of nitrogen, 66 g. of N-vinyl-2-pyrrolidone and a solution of 2.25 of azo-bis-isobutyronitrile and 0.75 t-butylperbenzoate dissolved in 120 g. of dibutyl maleate was added over a 2 hour period. After the 2 hour period, the mixture was heated for an additional hour at 105°C. The pressure was reduced to remove volatiles and an orange viscous fluid product was recovered.

EXAMPLE 10

A commercially availabe polymer of N-vinyl-2-pyrrolidone having an average molecular weight of 10,000 was obtained for use in the method of the present invention.

EXAMPLE 11

A mixture of 2600 g. of Polyglycol 15-200, 300 g. of ethyl vinyl ether and 50 g. of solid potassium bisulfate was stirred overnight under nitrogen at 50°C. The resulting solids were then removed by filtration. The filtrate had an acid number of 0.4 and a hydroxy number of 3.2. A solution of 51 g. of dibutyl maleate containing 0.95 g. azo-bis-isobotyronitrile and 0.3 ml. of t-butyl-peroxybenzoate was added over 2 hours to 157 g. of the above polyether acetal while stirring at 90°-95°C and simultaneously adding 35 g. of molten N-vinylcaprolactam. When the addition was complete, the solution was stirred 1 hour at 105°C, and then cooled. The resulting product was a viscous amber liquid.

EXAMPLE 12

The procedure of Example 11 was repeated except that the N-vinylcaprolactam was replaced by 28 g. of N-vinylpyrrolidone and the dibutyl maleate was replaced by 45 g. of dipropyl maleate.

EXAMPLE 13

The procedure of Example 12 was repeated except that the dipropyl maleate was replaced by 64 g. of di-n-hexyl maleate.

EXAMPLE 14

The procedure of Example 4 was repeated except that 83 g. of N-vinylcaprolactam was used in place of 66 g. of N-vinylpyrrolidone.

EXAMPLE 15

The procedure of Example 4 was repeated except that 105 g. of di-n-propyl maleate was used in place of the 120 g. of dibutyl maleate.

EXAMPLE 16

The procedure of Example 4 was repeated except that 150 g. of dihexyl maleate was used in place of the 120 g. of dibutyl maleate.

EXAMPLE 17

A deoxygenated solution of 30 g. of diethyl itaconate, 18 g. of N-vinylpyrrolidone, 0.5 g. of azo-bis-isobutyronitrile and 0.5 ml. of dodecyl mercaptan in 100 ml. of benzene was kept at 60°C for 18 hours. The solution was then treated with 48 g. of 2-ethoxyethyl acetate and the benzene removed under reduced pressure leaving a viscous amber liquid.

EXAMPLE 18

Equal amounts of toluene diisocyanate and the polymeric material of Example 1 of U.S. Pat. No. 3,746,663 were combined. The polymeric material comprises N-vinyl-2-pyrrolidone, dibutyl maleate and Voranol CP-3000 (a 3000 molecular weight triol prepared by oxypropylation of glycerol, available in commercial quantities from Dow Chemical Co.). After 3 hours, a gel was formed. In contrast, equal amounts of the product obtained in Example 1 of the present invention and toluene diisocyanate were combined. The resulting mixture was stable and remained in a homogeneous liquid state for over 1 month. The product of Example 4 of this invention when combined with TDI in the same manner was also stable and remained in a homogeneous liquid state for a similar period.

EXAMPLE 19

A typical insulating type of polyurethane foam was prepared by combining a solution of Selectrofoam 6406, Genetron 11 SBA and DABCO R-8020 with a solution of Hylene TIC and the product of Example 1 of this invention, in the following proportions:

|  | Grams |
| --- | --- |
| Selectrofoam 6406[1] | 109.0 |
| Genetron 11 SBA[2] | 47.0 |
| DABCO R-8020[3] | 1.0 |
| Hylene TIC[4] | 105.1 |
| Product of Example 1 | 1.5 |

1. Selectrofoam 6406 is a mixture of a polypropylene oxide propanol derivative of sucrose, and an alkylene oxide derivative of ethylene diamine having a molecular weight of about 800; see U.S. Pat. No. 3,153,002, assigned to PPG Co.

2. Genetron 11 SBA is a fluorotrichloromethane blowing agent.

3. DABCO R-8020 is a blend of triethylenediamine and dimethylethanolamine.

4. Hylene TIC is a technical grade of toluene diisocyanate. Hylene TIC is an undistilled toluene diisocyanate material which is a dark, brownish liquid having an NCO content of 38.75 to 39.75%, an amine equivalent of 105.5 to 108 and a viscosity at 25°C of 15–75 cps.

The cream time during the foam preparation was 13 seconds, the gel time was 43 seconds, the rise time was 84 seconds and the tack-free time was 64 seconds. The foam was excellent, uniform with no voids and had very fine cells.

EXAMPLES 20 – 28

The procedure of Example 19 was repeated except 1.5 g. of each of the products of Examples 2–10 above were substituted for the product of Example 1 of this invention. In each case, the cream, gel, rinse and tack-free times were essentially the same as set forth above in Example 19 and the foam was of relatively the same quality.

EXAMPLE 29

A polyisocyanurate rigid foam is prepared by combining a premix solution of PAPI 135, R-11 blowing agent and the product of Example 1 of this invention with DMP-30 in the following proportions:

|  | Grams |
| --- | --- |
| PAPI 135[1] | 135 |
| R-11[2] | 22 |
| DMP-30[3] | 13.5 |
| Product of Example 1 | 1.5 |

1. PAPI-135 is a methylene-linked polyphenylisocyanate comprising about 3 phenylisocyanate groups per molecule and having an average equivalent weight of 133.8.

2. R-11 is a trichlorofluoromethane blowing agent.

3. DMP-30 is 2,4,6-tris(dimethylaminomethyl)-phenol.

EXAMPLE 30

The procedure of Example 29 is repeated except that 15 grams of EPON 828, a bis phenol A epichlorohydrin adduct having an epoxy equivalent of 189 and a hydroxyl valve of 1670, are added to the premix solution to prepare a polyisocyanurate-oxazolidinone rigid foam.

We claim:

1. In the method of preparing a cellular foam from a precursor formulation comprising an isocyanate having at least two isocyanato groups per molecule, a catalyst, and a blowing agent, the improvement which comprises adding from 0.2 to 5.0 parts by weight per 100 parts by weight of said precursor formulation of the product of a free radical-initiated polymerization of a cyclic nitrogenous monomer as the sole monomer in said polymerization being carried out substantially to completion in the presence of a polyfunctional polyether polyol which has been treated with a capping agent to convert substantially all of the hydroxyl groups of said polyether polyol to groups substantially inert to isocyanates, said cyclic nitrogenous monomers having the structural formula:

$$H_2C=CH-N\underset{\underset{O}{\overset{\|}{C}}}{\overset{}{\diagup\diagdown}}(CH_2)_n$$

wherein
$n = 3$, 4, or 5.

2. The method in accordance with claim 1 wherein said cyclic nitrogenous monomer is N-vinyl-2-pyrrolidone.

3. In the method of preparing a cellular foam from a precursor formulation comprising an isocyanate having at least two isocyanato groups per molecule, a catalyst, and a blowing agent, the improvement which comprises adding from 0.2 to 5.0 parts by weight per 100 parts by weight of said precursor formulation of the product of a free radical-initiated copolymerization of a cyclic nitrogenous monomer having the structural formula:

$$H_2C=CH-N\underset{\underset{O}{\overset{\|}{C}}}{\overset{}{\diagup\diagdown}}(CH_2)_n$$

wherein
$n = 3$, 4, or 5 and an esterified unsaturated dibasic acid having the structural formula:

$$C_uH_{2u-2}(CO_2C_vH_{2v+1})_2$$

wherein
$u$ is 2 or 3, and
$v$ is an integer from 3 to 6,
said free radical-initiated copolymerization being carried out substantially to completion in the presence of a polyfunctional polyether polyol and the resulting material is treated with a capping agent to convert substantially all of the hydroxy groups of said polyether polyol to groups substantially inert to isocyanates.

4. The method in accordance with claim 3 wherein said cyclic nitrogenous monomer is N-vinyl-2-pyrrolidone.

5. The method in accordance with claim 4 wherein said esterified unsaturated dibasic acid is dibutyl maleate.

6. The method in accordance with claim 3 wherein said capping agent is selected from the group consisting of acetic anhydride, acetyl chloride, ketene, benzoyl chloride, benzoic acid, methyl isocyanate, ethyl isocyanate, phenyl isocyanate, butyric, caproic, capric, lauric, myristic, palmitic, stearic and oleic acids, methyl vinyl ether, n-butyl vinyl ether, isobutyl vinyl ether, and 2,3-dihydrofuran.

7. In the method of preparing a cellular foam from a precursor formulation comprising an isocyanate having at least two isocyanato groups per molecule, a catalyst, and a blowing agent, the improvement which comprises adding from 0.2 to 5.0 parts by weight per 100 parts by weight of said precursor formulation of the product of a free radical-initiated polymerization of a cyclic nitrogenous monomer having the structural formula:

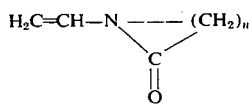

wherein
$n = 3$, 4, or 5 and an esterified unsaturated dibasic acid having the structural formula:

$$C_uH_{2u-2}(CO_2C_vH_{2v+1})_2$$

wherein
$u$ is 2 or 3, and
$v$ is an integer from 3 to 6, said free radical-initiated copolymerization being carried out substantially to completion in the presence of a polyfunctional polyether polyol which has been treated with a capping agent to convert substantially all of the hydroxyl groups of said polyether polyol to groups substantially inert to isocyanates.

8. The method in accordance with claim 7 wherein said cyclic nitrogenous monomer is N-vinyl-2-pyrrolidone.

9. The method in accordance with claim 7 wherein said esterified unsaturated dibasic acid is dibutyl maleate.

10. The method in accordance with claim 7 wherein said polyfunctional polyether polyol is capped by treating said polyol with a capping agent selected from the group consisting of acetic anhydride, acetyl chloride, ketene, benzoyl chloride, benzoic acid, methyl isocyanate, ethyl isocyanate, phenyl isocyanate, butyric, caproic, capric, lauric, myristic, palmitic, stearic and oleic acids, vinyl methyl ether, vinyl isobutyl ether, and 2,3-dihydrofuran.

* * * * *